Feb. 22, 1966 W. H. SALE ETAL 3,236,532
COMBINED DUSTGUARD AND OIL SEAL FOR JOURNAL BOX
Filed Feb. 15, 1963 2 Sheets-Sheet 1
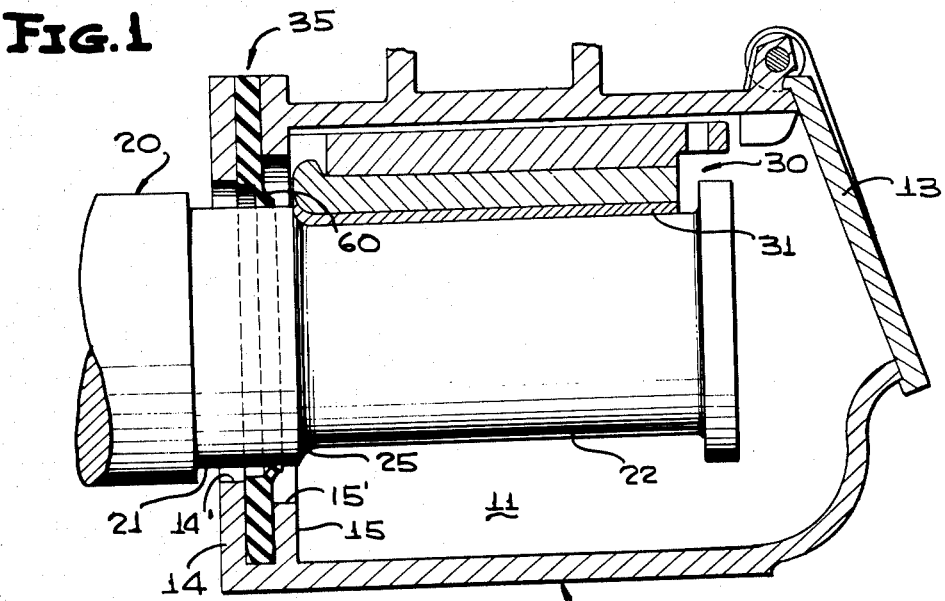
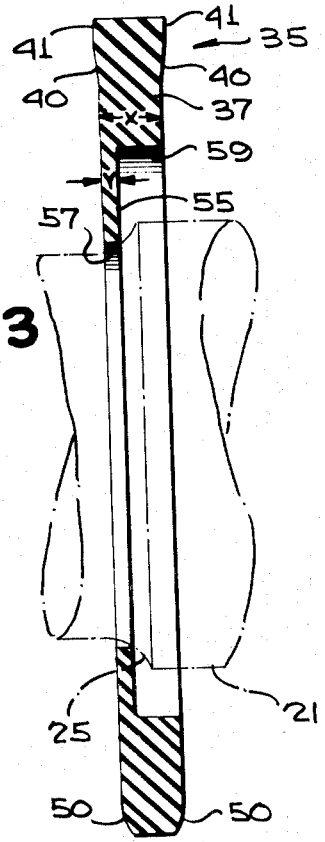
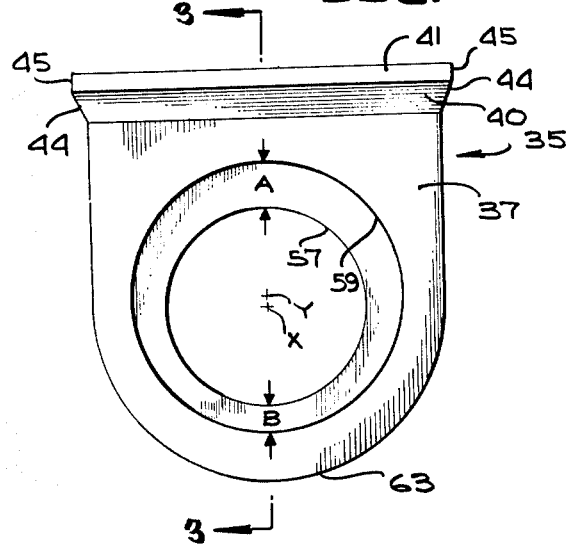
INVENTORS
WILLIAM H. SALE
& HENRY J. WINTRINGHAM
BY Shoemaker and Mattare
ATTORNEYS

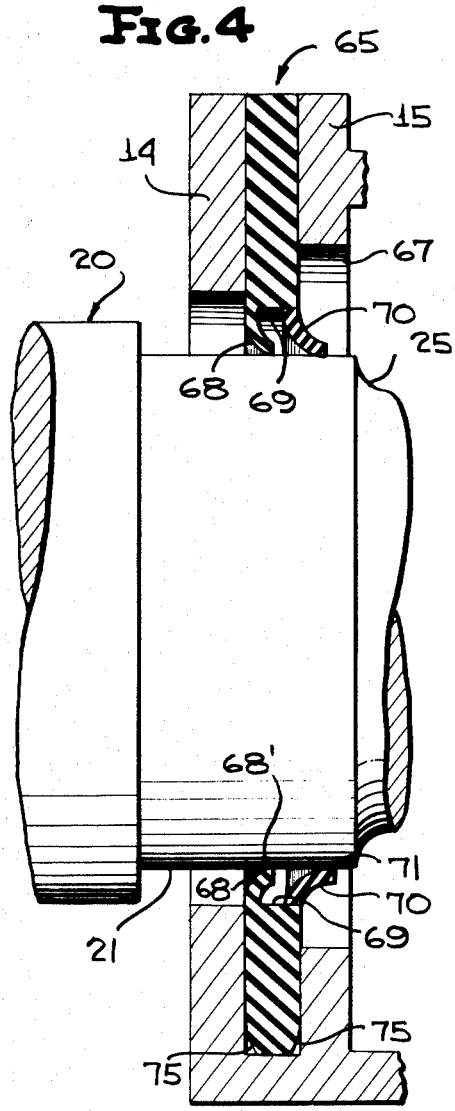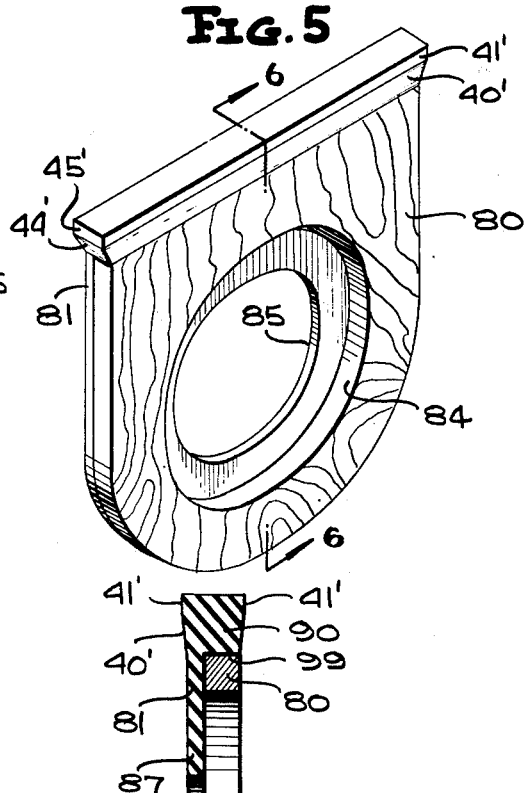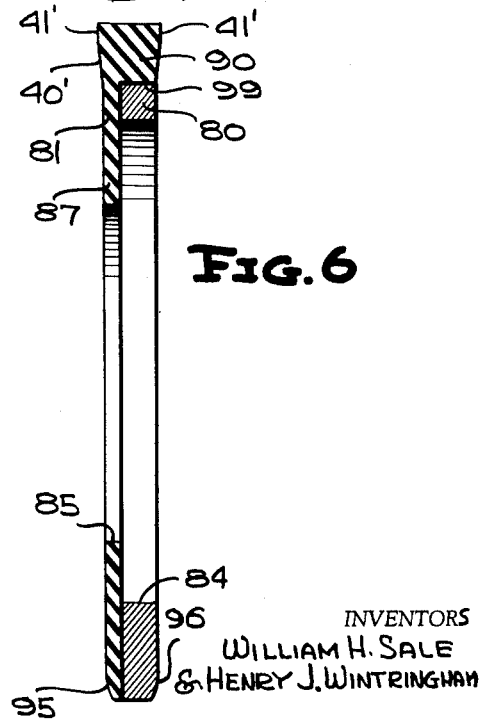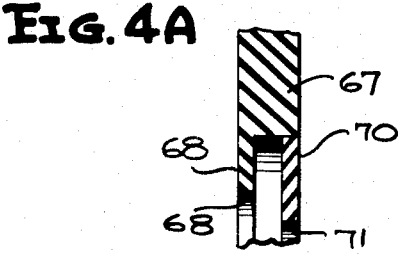

United States Patent Office 3,236,532
Patented Feb. 22, 1966

3,236,532
COMBINED DUSTGUARD AND OIL SEAL FOR JOURNAL BOX
William H. Sale, Richmond, Va., and Henry J. Wintringham, 2505 Tarpon Court, Norfolk, Va.; said Sale assignor to said Wintringham
Filed Feb. 15, 1963, Ser. No. 258,789
1 Claim. (Cl. 277—131)

The present invention relates to a new and novel sealing device for use in railroad journal boxes, and more particularly to an arrangement which serves the dual function of a dustguard and an oil seal.

In normal journal box constructions as presently employed on railway cars, the ends of the wheel axles are journalled within journal boxes, such journal boxes normally being provided with a bearing structure which rests on an axle journal portion as well as a lubricant impregnated material or waste which is disposed in the lower portion of the journal box for keeping the periphery of the axle journal portion coated with lubricant.

Journal boxes now in use also ordinarily incorporate a well portion which receives a conventional dustguard or the like. The present invention is directed to an improved form of sealing means which is adapted to be associated with the conventional well of a journal box, and wherein the sealing device of the present invention not only serves the function of serving as a dustguard to prevent foreign matter from entering the journal box, but the sealing means of the present invention also serves to ensure an effective oil seal to prevent the lubricant from escaping from the journal box.

It is firstly important to ensure an effective seal with the well so as to prevent the entry of any foreign material into the journal box since it is apparent that the presence of any sort of foreign material, and particularly dust and the like, will cause undue wear on the journal portion of the axle and thereby shorten the life thereof.

It is additionally quite important to prevent the escape of lubricant from the journal box, and a truly effective oil seal will save many thousands of gallons of lubricant over a year's time in a railroad operation utilizing many thousands of cars as is now the case. Not only is it important to conserve the lubricant from a purely economic standpoint as regards the cost of replacing the lubricant, but it is furthermore important to conserve the lubricant while the associated railroad car is being utilized since it is the escape of the oil during use which causes overheating and occurrence of the well-known "hot box" which results in a considerable amount of down time of the railroad cars while this condition is being rectified.

A further problem encountered with sealing means employed in the prior art has been the fact that there is a great deal of wear on this type of sealing means and that the sealing means must be often replaced or adjusted in order to successfully perform its function. It is accordingly a feature of the present invention to provide a sealing means which effectively maintains a seal and is in fact more or less self-adjusting since it will compensate for a considerable amount of wear and still maintain an effective sealing relationship with a portion of an associated axle.

The arrangement of the present invention includes a body means having a relatively rigid portion and a relatively flexible portion. The rigid portion is adapted to provide a very effective and efficient seal with the associated well of the journal box to prevent the entry of foreign matter and also to ensure that no oil will escape between the sealing means and the journal box itself in the well portion thereof.

The flexible portion of the sealing means of the present invention is adapted to engage a portion of the axle, the flexible means being in the form of a rubber-like material or equivalent substance which is adapted to readily deform and at the same time conform to the shape of the axle. The flexible portion of the present invention includes a hole therethrough adapted to receive an axle portion, the hole being of lesser diameter than the associated axle portion whereby the flexible portion is maintained in tight sealing engagement with the axle portion and at the same time permits free lateral movement of the axle with respect to the journal box.

The arrangement is furthermore such that the sealing means is not damaged or interfered with in any way by the conventional brass journal bearing employed in such arrangements.

The flexible portion of the sealing body means of the present invention is so arranged that when the associated axle portion is inserted through the hole therein, the flexible portion will be deformed into a substantially frusto-conical shape which ensures that oil thrown upwardly within the journal box and toward the oil seal will drain downwardly along such frusto-conical surface to reduce wear and overheating of the sealing means and the journal box components to a minimum. The rigid portion of the body means is also provided with a recess adjacent to the hole in the flexible portion of the body means, the hole in the flexible portion being offset with respect to the center portion of the recess in the rigid body portion such that the flexible portion on one side of the hole therethrough is of a greater degree of flexibility than the diametrically opposite portion of the flexible body portion on the other side of the hole.

The arrangement of the invention is such that the part of the flexible portion of the body means which rides over the top of the associated axle portion is more flexible than the lower or under part of the flexible portion of the body means of the oil seal which rides against the under surface of the associated axle portion. This greater degree of flexibility at the upper side of the hole through the sealing means ensures the aforedescribed drainage of oil downwardly along the outer surface of the flexible portion of the sealing means to obtain the most effective degree of lubrication and cooling by the oil flowing down along this surface.

Several different modifications of the present invention are illustrated herein, and in one proposed modification, two separate and independent flexible portions are provided spaced from one another, each of the flexible portions having a hole formed therethrough as aforedescribed for receiving a portion of an axle. The holes formed through each of these flexible portions are concentric with one another and each is offset with respect to a recess formed adjacent thereto in the rigid body portion for the purpose aforesaid.

In another possible modification of the present invention, the rigid body portion is disclosed as comprising a separate piece of material formed of a different material from the flexible portion of the body means. It is apparent that the flexible and rigid portions of the body means may be either formed of separate materials or may be formed of the same material, the rigid portion in such instance being of considerably greater thickness than the flexible portion so as to impart the desired degree of stiffness and flexibility to the respective portions.

Since the sealing means of the present invention has a rather tight sliding fit with the associated well portion of the journal box, the lower portions of the sealing means are preferably provided with tapered surfaces for facilitating entry of the sealing means into the well of the journal box. The upper edges of the sealing means are also tapered in such a manner as to provide a very effective fluid-tight seal with the upper side wall portions of the well of the journal box.

An object of the present invention is to provide a new and novel sealing device for journal boxes which serves the dual function of a dustguard and an oil seal.

Another object of the invention is the provision of a combined dustguard and oil seal for a journal box which positively prevents the entry of foreign matter into the journal box and further which ensures that there will be no leakage of oil out of the journal box and around the associated axle.

A further object of the invention is to provide a combined dustguard and oil seal for a journal box which forms a shape upon insertion of an axle therethrough such as to ensure that oil within the journal box which is thrown upwardly and to the side will feed downwardly along the surface of the flexible portion of the sealing means to reduce wearing of the seal an overheating of the journal box to a minimum.

A still further object of the invention is the provision of a combined dustguard and oil seal for a journal box which will allow free lateral movement of an axle and which retains its sealing effect even after wear of the sealing means, and further which will not be damaged by the brass journal bearing of the journal box during use.

Still another object of the invention is to provide a combined dustguard and oil seal which is quite simple and inexpensive in construction and yet which is sturdy and efficient in use.

Other objects and many attendant advantages of the invention will become more apparent when considered in connection with the specification and accompanying drawing, wherein:

FIG. 1 is a longitudinal section through a conventional journal box showing the journal box and axle therein in association with a sealing means according to the present invention;

FIG. 2 is a front elevation of the combined dustguard and oil seal of the present invention as illustrated in operative position in FIG. 1;

FIG. 3 is an enlarged section taken along line 3—3 of FIG. 2 looking in the direction of the arrows and showing an associated axle relative thereto;

FIG. 4 is a longitudinal section through a modified form of the invention;

FIG. 4a discloses a portion of the combined dustguard and oil seal as shown in FIG. 4 in its free form;

FIG. 5 is a perspective view of a still further modification of the present invention; and FIG. 6 is a sectional view taken substantially along line 6—6 of FIG. 5 looking in the direction of the arrows.

Referring now to the drawings wherein like reference characters designate corresponding parts throughout the several views, there is shown in FIGS. 1–3 a first modification of the invention, and as seen particularly in FIG. 1, a journal box 10 of conventional design is provided, this journal box being adapted to be supported at the end of a railroad truck frame member in a conventional manner. The journal box is provided with a pair of side wall portions one of which numbered 11 is seen in FIG. 1. A front access opening is provided to the journal box and is closed by a hinged cover 13. At the opposite or rear end of the journal box, a pair of spaced walls 14 and 15 are provided, these walls defining therebetween a well portion commonly referred to as a dust cover well, these walls defining therebetween a space which is closed on all sides except at the upper portion as seen in FIG. 1 such that a sealing means can be inserted downwardly between the spaced walls 14 and 15.

Openings 14' and 15' are provided respectively through walls 14 and 15, these two openings being substantially concentric with one another and opening 15' being of larger diameter than opening 14' as will be apparent. These openings are adapted to receive a journal portion of the axle.

The railroad axle is indicated generally by reference numeral 20, and includes a first reduced cylindrical seat portion 21 which in turn joins with a journal portion 22 through an intermediate tapering portion 25. The journal box is supported on the actual journal portion 22 by means of a bearing structure indicated generally by reference numeral 30 and including the conventional arcuate "brass" 31 which rests on the upper periphery of the axle journal portion 22. The lower portion of the journal box is normally stuffed with a lubricant impregnated material which has been eliminated from the drawing for the sake of clarity.

The sealing means of the first modification is indicated generally by reference numeral 35, and as illustrated in this modification the sealing means may comprise a single integral piece of material formed of neoprene rubber or similar substance which has the characteristic of being relatively rigid when provided of a substantial thickness while being relatively flexible when provided of a considerably less thickness. The body means of the sealing means includes a first major thick portion 37 having a thickness $x$, which in a typical example may be a thickness of ⅞ of an inch wherein the over-all height of the body means in a vertical direction may be approximately 11⅞ inches.

It will be noted that the forward and rear faces of the bory portion 37 are tapered upwardly and outwardly as indicated by reference numerals 40 and terminate in upper vertical side walls 41. These portions 40 and 41 are adapted to provide a tight seal with the corresponding wall portions 14 and 15 of the well of the journal box when the sealing means is inserted in operative position as indicated in FIG. 1.

In other words, when the sealing means is inserted into the position shown in FIG. 1, the portions 40 and 41 are compressed into tight sealing engagement with the upper and inner wall portions of the well so as to positively ensure that no foreign matter can enter between the forward and rearward sides of the sealing means and the associated walls of the well, and furthermore that no oil can possibly escape between the spaces.

As seen particularly in FIG. 2, the opposite side walls of the sealing means are tapered upwardly and outwardly as indicated by reference numerals 44 and terminate in vertically upwardly extending wall portions 45. The side wall portions of the well may be provided with a similarly tapered configuration adapted to snugly and tightly fit the portions 44 and 45 of the sealing means to effect a good seal therebetween to form the same function as described in connection with surfaces 40 and 41 and their associated walls of the well.

As seen particularly in FIG. 3, the lower edge portions 50 of the sealing means may also be tapered to facilitate entry of the sealing means into the well of the journal box since the sealing means has substantially the same dimension as the well and is a tight fit therewith.

The central part of the sealing means includes a flexible body portion 55 having a thickness indicated at $y$ which is substantially less than the thickness $x$ of the other body portion 37. In a typical example, the thickness $y$ may comprise a quarter of an inch, and the relative ratios of the thicknesses of body portions 37 and 55 respectively cause the body portion 37 to be relatively rigid while the body portion 55 is relatively flexible. Flexible body portion 55 is provided with a central circular opening 57.

The relatively rigid body portion 37 is provided with a recess 59 which is formed adjacent the flexible body portion 55, and as seen more particularly in FIG. 2, recess 59 may be oblong in configuration while opening 57 through the flexible body means is circular in shape. The center of the circular opening 57 is indicated at $x$ in FIG. 2, while the center of the oblong opening 59, or in other words a point which is halfway between the upper and lower edges of recess 59, lies at $y$. It will accordingly be noted that the centers $x$ and $y$ of the hole 57 and recess 59 respectively are offset with respect to one another, and the arrangement is such that the distance indicated by arrows A in FIG. 2 is greater than the distance indicated by arrows B in FIG. 2, that is to say, the greatest dimension of the flexible body portion 55 lies on a center line directly above hole 57 while the least dimension of the flexible wall portion lies on the center portion directly below the hole 57. In other words, A is the greatest dimension of the flexible body portion, while B is the least dimension thereof.

The arrangement described immediately above thereby affords the greatest degree of flexibility to the flexible body portion 55 in the area where its dimension is A, while the least flexibility of the flexible wall portion will be in those areas having a dimension B. As pointed out previously, this affords greater flexibility to the upper part of the flexible wall portion such that it will ensure drainage of fluid down along the outside of the sealing means when it is in operative position to lubricate and cool the structure.

As seen in FIG. 1, the outer surface 60 of the sealing means is deformed into a substantially frusto-conical configuration when the apparatus is in operative position due to the fact that the hole 57 is of less diameter than the seat portion 21 of the axle. In a typical example, the seat portion 21 of the axle may have an outside diameter of 6½ inches while the hole 57 may have a diameter of approximately 5⅞ inches. By so dimensioning the hole 57, the configuration shown in FIG. 1 is assured, and furthermore, this construction assures that the sealing flexible portion 55 will remain in sealing engagement with the seat portion 21 even after a considerable amount of wear has occurred around the edges of hole 57. A further feature of this arrangement is the fact that the edge portion of the flexible body portion 55 surrounding hole 57 may ride down along the tapered portion 25 upon movement of the axle 20 to the left as seen in FIG. 1 to retain a seal with the tapered portion 25 during such relative movement between the axle and the journal box.

Referring to FIG. 3, the relationship of the sealing means in its free form to the dimensions of an axle are illustrated, and it will be seen from this figure that the hole 57 is considerably smaller than the seat portion 21 of the axle, and furthermore, that the sealing means will retain a seal with the tapered portion 25 of the axle for a substantial degree of movement of the axle to the left of the journal box as seen in FIG. 1.

It will be noted as seen particularly in FIG. 2 that the side walls of the sealing means 35 are straight and parallel with one another, while the bottom wall portion 63 thereof is substantially arcuate in configuration, it being understood that the bottom portion of the well of the journal box is correspondingly shaped so as to snugly receive the sealing means when it is inserted in operative position within the journal box well.

Referring now to FIG. 4 of the drawings, a modified form of the invention is illustrated, wherein the same journal box and axle structure as employed previously are illustrated, the journal box walls 14 and 15 being indicated, and the axle portions 20, 21 and 25 being illustrated.

In this modification, the sealing means is indicated generally by reference numeral 65. Sealing means 65 includes a relatively rigid portion 67 and a flexible body portion 68. The rigid portion 67 is provided with a recess 69. A second flexible body portion indicated generally by reference numeral 70 defines a central opening 71 concentric with the opening 68' provided through the flexible body portion 68. Flexible body portion 70 may comprise a substantially annular shaped member which is secured as by vulcanizing or other suitable means to the inner face of the rigid body portion 67. It will be noted that in the modification shown in FIG. 4, a pair of spaced flexible body portions are provided which in effect provides two separate and independent longitudinally spaced sealing portions where the openings 68' and 71 respectively receive the associated axle portions. The openings 68' and 71 are concentric with one another and both are offset with respect to recess 69 in the same manner in which the hole 57 previously described is offset with respect to the recess 59.

A further advantage of the modification shown in FIG. 4 is that it is possible for the outer flexible portion 70 to ride down along the tapered portion 25 of the axle while the flexible body portion 68 still retains the seal with the seat portion 21 of the axle. In this manner, the double seal provided by this modification gives even greater assurance that no oil will leak between the axle and the sealing means.

As seen at the lower portion of FIG. 4, the bottom edges 75 of the rigid body portion 67 are tapered to facilitate entry of the sealing means into the well of the journal box.

As seen in FIG. 4a, the free form of the combined dustguard and oil seal as seen in FIG. 4 is such that the second flexible body portion 70 extends radially inwardly of the portion 68 whereby the opening 71 defined by portion 70 is of slightly less diameter than the opening 68' defined by portion 68.

Referring now to FIGS. 5 and 6, a further modified form of the invention is illustrated including a rigid body portion 80 and a flexible body portion 81. In this example, the rigid and flexible body portions may be formed of different materials, and in a typical example, the rigid body portion 80 may be formed of wood such as plywood and the like which is strong and relatively light, while the flexible body portion 81 may be formed of neoprene rubber or a similar substance. Portions 80 and 81 are provided with openings 84 and 85 respectively, opening 84 corresponding in size and location with the opening 59 discussed in connection with FIG. 2, while opening 85 may correspond in size and location with the opening 57 shown in FIG. 2. In other words, the hole 85 in the flexible body portions is offset downwardly with respect to the center of the opening 84 in the rigid body portion 80 to thereby provide an arrangement wherein the portion 87 of the flexible body means is the most flexible area thereof and accordingly is adapted to serve the same function as the aforedescribed modifications.

The upper portion 90 of the flexible body portion 81 is constructed identically with the upper portion of the rigid body portion 37 of the modification shown in FIGS. 1, 2, 3. Accordingly, this upper body portion 90 of the modification shown in FIGS. 5 and 6 is provided with tapered side walls 40' and 44' which join with the vertical edges 41 and 45 respectively so as to enable an effective fluid-tight seal with the inner walls of the well of the associated journal box.

The rigid and flexible body portions 80 and 81 may be suitably secured together by any adhesive means or the like indicated by reference numeral 93 which may be positioned between the facing surfaces of the two members.

As seen particularly in FIG. 6, the lower edge portion of the flexible body portion 81 is tapered as indicated at 95, and the lower edge portion of the rigid body portion 80 is tapered as indicated at 96. These tapered portions 95 and 96 facilitate entry of the sealing means into the well of the associated journal box.

It is apparent from the foregoing that there is provided according to the present invention a new and novel sealing arrangement for journal boxes which serves the dual function of a dustguard and an oil seal. The upper tapered side edges of the body means of each of the modifications serves to positively prevent the entry of foreign matter between the sealing means and the well walls of the journal box, while the provision of the hole in the central flexible portion of the sealing means which is of less diameter than the outer surface of the axle so as to form a substantially conical surface on the sealing means positively prevents the leakage of oil between the sealing means and the axle because the sealing means is retained in tight frictional engagement with the axle portion at all times. In addition, this frusto-conical shape in combination with the greater flexibility of the sealing means immediately above the axle ensures that oil will drain or feed downwardly along the surface of the flexible portion of the body means toward the axle to reduce wear and overheating to a minimum. The flexible nature of the sealing means allows free lateral movement of the axle with respect to the sealing means, and the arrangement is such that the brass journal bearing of the journal box will not interfere with or damage the sealing means at any time during operation. The flexible body portion and the relative dimensions of the hole in the flexible body and the outer surface of the axle is such as to ensure an effective seal between the sealing means and the axle even after the sealing means has been subjected to considerable wear. It is evident that the structure of the various modifications is quite simple and inexpensive in construction and yet at the same time is sturdy and efficient in use. By tapering the lower edges of the body means of each modification of the invention, means is provided for facilitating entry of the sealing means into the well of the journal box even though there is a tight sliding fit between the sealing means and the walls of the well. A modification of the invention is also illustrated wherein a double seal is provided to provide an additional safeguard against the escape of oil or the entry of foreign material into the journal box.

A further point of interest is the fact that the axle causes distortion of the sealing means in all the modifications of the invention due to the fact that the hole through the flexible sealing portion is smaller than the outer dimension of the axle, and this distortion normally tends to twist the sealing means so as to cause it to bulge toward the interior of the journal box thereby forcing the front and back surfaces of the sealing means even more tightly against the associated walls of the well of the journal box to further ensure that a tight seal will be obtained therebetween.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

A combined dustguard and oil seal for insertion into the dustguard well of a railway car axle journal box having a dustguard slot, to have sealing engagement with a cylindrical dustguard seat portion of a certain diameter which is joined by a tapered portion with the reduced diameter cylindrical journal portion of a car axle; said dustguard and oil seal comprising:

a substantially flat body means including a relatively thick and relatively rigid portion of a certain thickness to fit snugly in the dustguard journal box slot and having forward and rear faces, said thick relatively rigid portion having a recess of even depth throughout formed in the central part of the rear face thereof closely approaching in its depth the forward face and thereby defining a relatively thin flexible web portion flat throughout its entire rear and front sides and of materially less cross-sectional thickness than the cross-sectional thickness of said rigid portion, said flexible web portion being of substantially constant thickness throughout and with an edge of said web defining a circular hole adapted to receive the cylindrical dustguard seat of an axle, said hole having a center offset downwardly with respect to the center of said recess and positioned with respect to said recess such that the distance between the top of the hole and the top of the recess is greater than the distance between the bottom of the hole and the bottom of the recess to provide the upper portion of said web of greater width than the lower portion of the web to afford a greater degree of flexibility to the flexible web portion immediately above said hole and to sealingly receive the said dustguard seat portion of the axle, the said forward and rear faces of said thick relatively rigid portion of the body means being substantially parallel and such portion being of substantially constant thickness through a major part of the body, the flexible web portion having a forward face substantially co-planar with the forward face of said body means, the said hole having a certain diameter relative to said certain diameter of the cylindrical axle dustguard seat and the said distance between the top and bottom of the hole and the top and bottom of the recess respectively, to cause flexing of the web forwardly on the seat into a substantially frusto-conical form when in operative engagement with the seat and to produce extension of the web from the seat toward and onto the taper joining the seat with the reduced diameter journal portion of the axle upon a relative axial movement in one direction between the car axle and the dustguard.

References Cited by the Examiner

UNITED STATES PATENTS

| | | | |
|---|---|---|---|
| 2,071,736 | 2/1937 | Farmer | 277—174 |
| 2,768,012 | 10/1956 | Klinger. | |
| 2,888,279 | 5/1959 | Rogers | 277—146 |
| 2,964,338 | 12/1960 | Hoyer | 277—130 X |
| 3,022,097 | 2/1962 | Seniff et al. | 277—104 |
| 3,035,844 | 5/1962 | Bollinger | 277—132 |

FOREIGN PATENTS 545,437  5/1942  Great Britain.

LAVERNE D. GEIGER, *Primary Examiner.*

SAMUEL ROTHBERG, *Examiner.*